US005621197A

United States Patent [19]

Bender et al.

[11] Patent Number: 5,621,197

[45] Date of Patent: Apr. 15, 1997

[54] DEVICE FOR INTERRUPTING THE FLOW OF CURRENT IN THE POSITIVE OR IMPREGNATED VEHICLE BATTERY CABLE

[75] Inventors: Richard Bender, Lauf; Christian Herget, Peissenberg; Lothar Maier, Tüssling; Alfred Krappel, Ismaning; Robert Albiez, Reichertshofen; Maximilian Gröbmair, Dietramszell, all of Germany

[73] Assignees: TEMIC Bayern-Chemie Airbag GmbH, Aschau; Bayerische Motoren Werke Aktiengesellschaft, Munich, both of Germany

[21] Appl. No.: 443,223

[22] Filed: May 17, 1995

[30] Foreign Application Priority Data

Jun. 24, 1994 [DE] Germany .......................... 44 22 249.1

[51] Int. Cl.[6] .......................... B60R 16/04; H01H 73/34; H01H 35/14; H01H 85/00

[52] U.S. Cl. ...................... 200/61.08; 180/271; 180/279; 337/401

[58] Field of Search ................ 200/61.08; 337/388–417; 429/7, 8, 65, 111–119; 102/202.9, 204, 207, 530, 531, 333; 180/271–279; 439/258

[56] References Cited

U.S. PATENT DOCUMENTS

| | | | |
|---|---|---|---|
| 3,793,501 | 2/1974 | Stonestrom | 200/61.08 |
| 4,339,638 | 7/1982 | Lascelles et al. | 200/52 R |
| 4,581,504 | 4/1986 | Hamel, Sr. | 200/61.08 |
| 5,262,753 | 11/1993 | Duplaix | 337/413 |
| 5,535,842 | 7/1996 | Richter et al. | 200/61.08 X |

FOREIGN PATENT DOCUMENTS

| | | | |
|---|---|---|---|
| 0526315 | 2/1993 | European Pat. Off. | H01H 39/00 |
| 2616958 | 6/1987 | France | H01H 37/76 |
| 1904244 | 8/1970 | Germany | H01H 39/00 |
| 2131204 | 1/1973 | Germany | H01R 13/68 |
| 2317930 | 2/1974 | Germany | F42D 3/00 |
| 2327261 | 1/1975 | Germany | B60R 21/10 |
| 2701935 | 7/1978 | Germany | H01H 33/74 |
| 2909252 | 8/1980 | Germany | H01H 39/00 |
| 3425836 | 1/1986 | Germany | B01J 1/00 |
| 4110240 | 10/1992 | Germany | H02H 3/087 |
| 4208011 | 9/1993 | Germany | B60R 16/04 |
| 9401486.8 | 3/1994 | Germany | H01H 39/00 |

*Primary Examiner*—J. R. Scott
*Attorney, Agent, or Firm*—Spencer & Frank

[57] ABSTRACT

A device for disconnecting the flow of current in the positive or impregnated battery cable of a motor vehicle has an electrically conductive plug-in connection that can be placed in the positive or impregnated battery cable in the form of a housing and a plug connector. The housing contains a gas generator of the kind used, for example, for belt tighteners. The gas generator is arranged in the housing in such a way that the propellant gas produced when the gas generator is ignited electrically separates the connector from the housing and this in turn interrupts the flow of current in the positive or impregnated battery cable. Consequently, a short circuit that might occur in the event of an accident and which could otherwise lead to damage of the cable tree and then set the vehicle on fire, is avoided in good time.

24 Claims, 4 Drawing Sheets

DEVICE FOR INTERRUPTING THE FLOW OF CURRENT IN THE POSITIVE OR IMPREGNATED VEHICLE BATTERY CABLE

BACKGROUND OF THE INVENTION

The invention relates to a device for interrupting the flow of current in the positive or impregnated cable of a vehicle battery.

In vehicle accidents, the cable tree is frequently damaged, resulting in a short circuit setting the vehicle on fire. If the current flow in the cable connected to the battery could be interrupted in good time, i.e., before a short circuit occurs, then a short circuit and the consequences of this could be prevented.

Pyrotechnic disconnecting devices for electrical cables are already known in principle (U.S. Pat No. 3,793,501 and DE 23 17 930 C2) and are used for example as power switches (DE 19 04 244 and 29 09 252) or as igniters for military warheads (EP 0 526 315 A1). The previously known pyrotechnic disconnecting devices vices are, however, of relatively elaborate design and less suitable for the purpose according to the present invention.

SUMMARY OF THE INVENTION

The object of the invention is to provide a device with which a short circuit can be prevented should the cable tree become damaged in the event of an accident.

According to the invention there is provided a device for disconnecting the flow of current in the positive or impregnated battery cable of a motor vehicle, with an electrically conductive plug-in connection that allows current to flow through the positive or impregnated battery cable when connected and that interrupts when disconnected, and a gas generator that is associated with the plug-in connection in such a way that when the gas generator is ignited electrically the propellant gas so generated disconnects the plug-in connection.

A gas generator can be used of the type found in motor vehicles as propellant gas generator for belt tighteners or as ignition gas generator for the solid propellant of an airbag (refer for example to DE 34 25 836 A1). For igniting the gas generator, a sensor system can be used that triggers in the event of an accident, similar to the systems used with increasing frequency in vehicles in conjunction with belt tighteners and/or airbags.

According to a preferred embodiment of the invention, it is provided for the plug-in connection to be made of a tubular electrically conductive housing containing the gas generator and an electrically conductive plug connector that, when connected together, are in contact with each other on contact surfaces that are parallel to a longitudinal axis of the plug-in connection and can be disconnected by a linear relative movement along the longitudinal axis. The housing has a free inner chamber that can be pressurized by the propellant gas and which is bounded at one front end by an exposed surface of the plug connector perpendicular to the longitudinal axis and at another front end on the opposite side by the gas generator which has a gas outlet aperture leading into the inner chamber. In particular, the invention allows for the plug-in connection to be disconnected within a very short period of time so that a short circuit resulting from an accident is safely prevented.

The solution according to the invention is distinguished by its simple design and consequently the low manufacturing and assembly costs, thus making it suitable for mass production. It also offers great functional dependability and long life.

BRIEF DESCRIPTION OF THE DRAWINGS

Preferred embodiment examples of the invention will now be described in more detail on the basis of the drawings. These show.

In the various embodiment examples of the four Figures, the parts with equivalent function have been designated by the same reference numbers even though they can differ in detail design.

DESCRIPTION OF THE PREFERRED EMBODIMENTS

Figure 1:
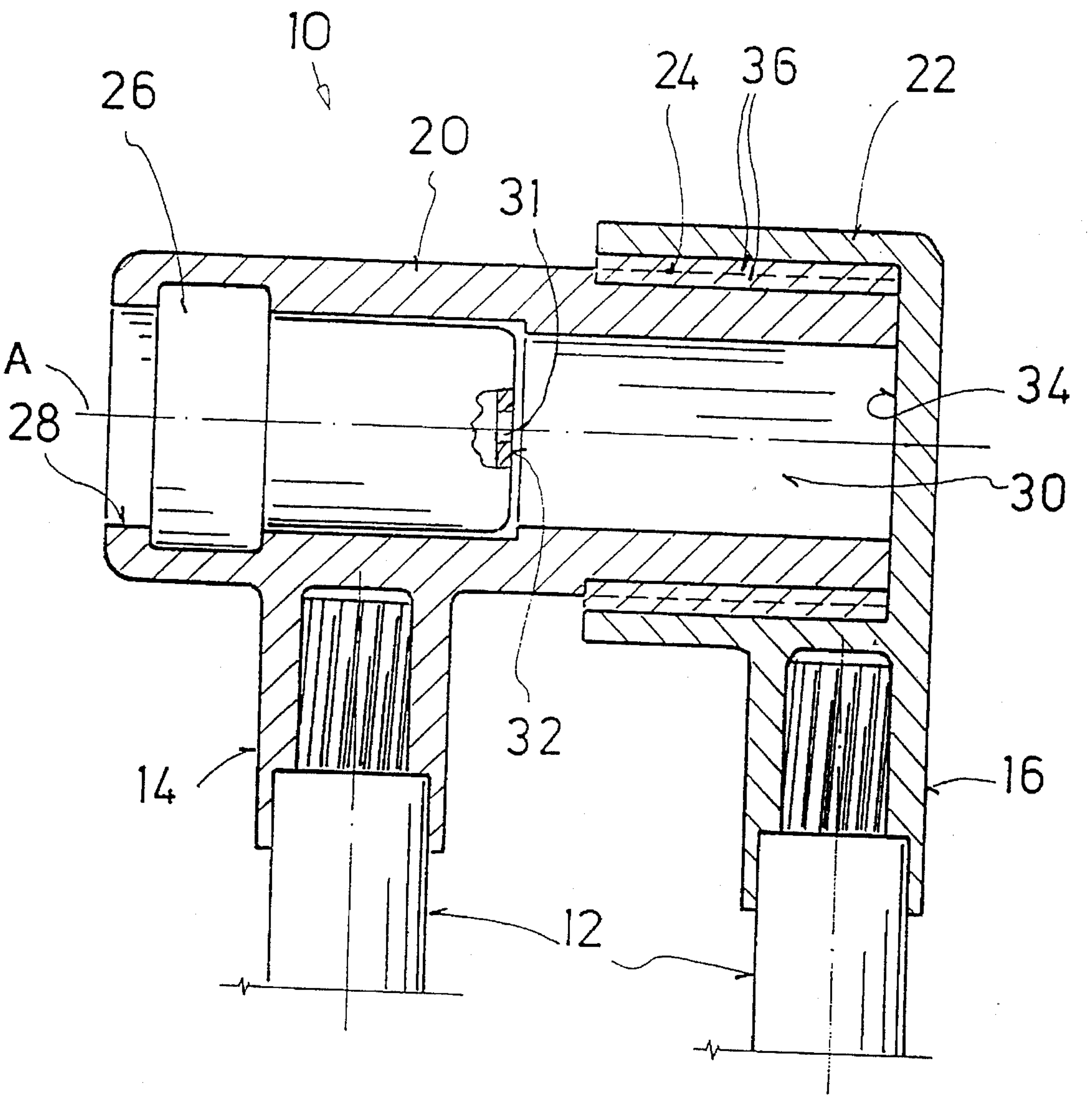
FIG. 1 is a longitudinal section through a first embodiment example of the invention.

The device shown in FIG. 1 for interrupting the flow of current in the positive or impregnated battery cable of a vehicle battery (not shown) consists of a plug-in connection 10 that is placed in the positive or impregnated battery cable 12 by means of terminal connections 14, 16 in such a way that it allows current to flow when connected (as shown) and interrupts the flow when disconnected (not shown).

The plug-in connection 10 consists of a tubular, approximately cylindrical electrically conductive housing 20 and an electrically conductive plug connector 22. The housing 20 and the plug connector 22 can be plugged together and disconnected from each other by a linear relative movement along the longitudinal axis A of the plug-in connection 10 and are held together by frictional contact when connected. The electrical connection between the housing 20 and the plug connector 22 is made through cylindrical contact surfaces 24 parallel to the longitudinal axis A.

In the left-hand side section of the housing 20 there is a gas generator 26 that is held axially immovable by shoulders on the housing. The gas generator 26, which can be constructed like the gas generator used for belt tighteners in accordance with DE 34 25 836 A1, has a propellant charge (not shown) and an electrical igniter (not shown) and is connected, through an electrical connecting cable that passes through an aperture 28 in the housing 20, with a suitable on-board sensor system (not shown) that produces an appropriate control signal for igniting the gas generator in the event of an accident.

The housing 20 has a free inner chamber 30 adjoining the gas generator 26. A gas outlet aperture 31 of the gas generator 26 opens into the inner chamber 30 on its (in the Figure) front end 32 that is on the left-hand side in such a way that propellant gas emerging from the gas generator 26 following ignition is forced out along the longitudinal axis A into the inner chamber 30. On its right-hand front end, the inner chamber 30 is bounded by a pressure surface 34 of the plug connector 22. The pressure surface 34 is perpendicular to the longitudinal axis A so that the pressure developed by the propellant gas in the inner chamber 30 exerts a force on the plug connector 22 that acts along the longitudinal axis A and can thus cause the plug connector 22 to separate from the housing 20.

The method of functioning of the device described should be plain from the description above. If the gas generator 26 is ignited by means of the sensor system in the event of an accident, it expels the generated propellant gas into the inner chamber 30. The propellant gas that is forced against the pressure surface 34 of the plug connector 22 pushes the housing 20 and the plug connector 22 apart and thus interrupts the current flow in the positive or impregnated bakery cable 12. Should an arc occur at the contact surfaces 24, it is extinguished by the remaining propellant gas.

With the device described, an extremely short disconnection period can be achieved. The disconnection period, i.e., the time between electrical control signal from the sensor system up to complete disconnection of the plug connector 22 from the housing 20, is no more than 4 ms. In this way, a short circuit and a resultant vehicle fire can safely be prevented.

In the embodiment example shown in FIG. 1, the plug connector 22 is constructed as a sleeve-shaped external plug connector that can be pushed over the external surface of the housing 20. The plug connectors 22 shown in FIGS. 3 and 4 are of similar design, whereas in the embodiment example of FIG. 2 the plug connector is made as a conical internal connector that can be inserted into the inside of the housing 20.

The contact surfaces 24 between the housing 20 and the plug connector 22 must on the one hand have a low electrical contact resistance and on the other hand they must remain free of corrosion over lengthy periods of time. In the embodiment examples shown in FIGS. 1 and 2, the contact surfaces are provided by special inserts 36 that are inserted in the housing 20 and in the plug connector 22. The inserts 36 can be made, for example, of copper beryllium (CuBe).

Figure 3:
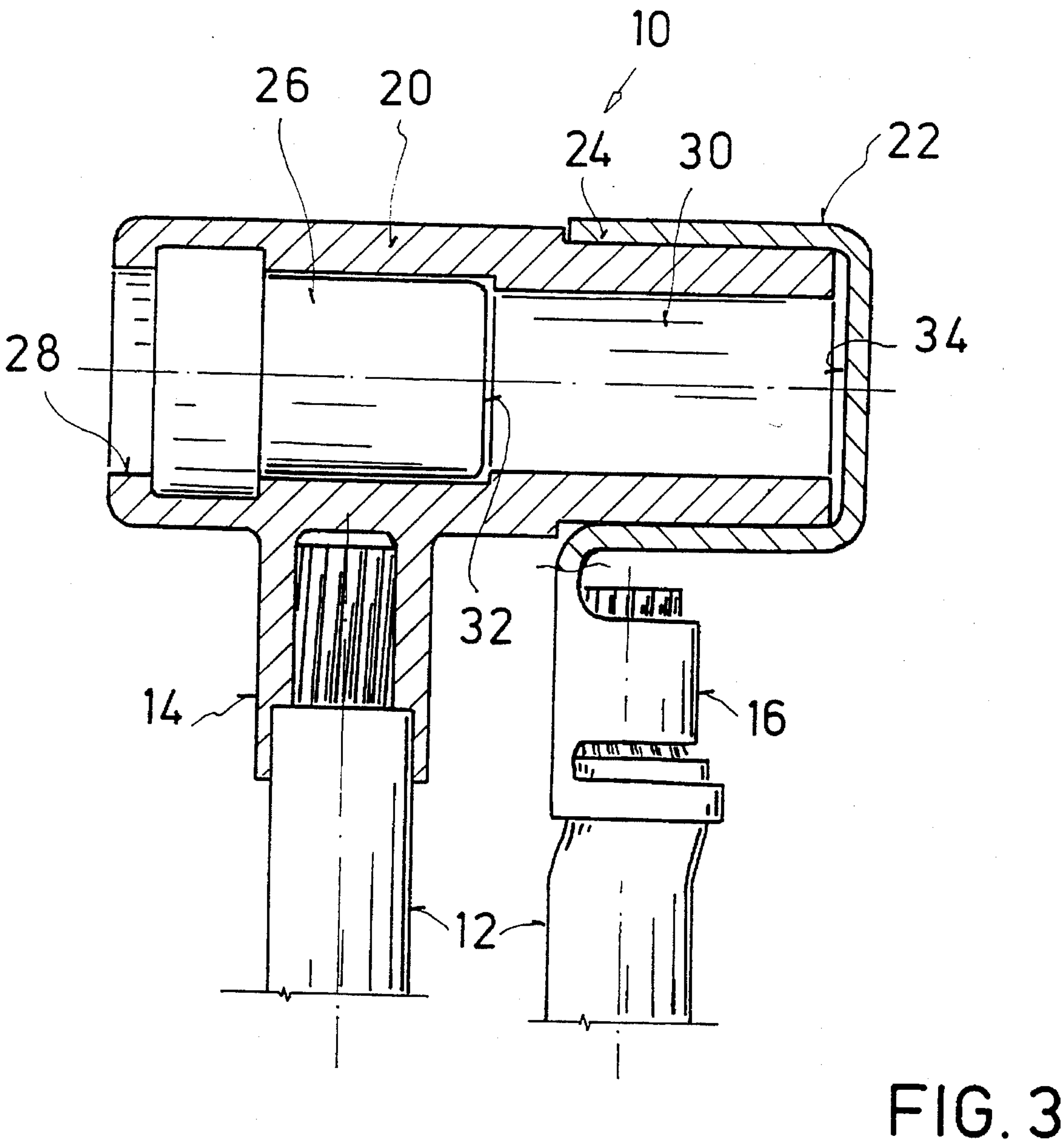
FIG. 3 is a longitudinal section through a third embodiment example of the invention.
Figure 4:
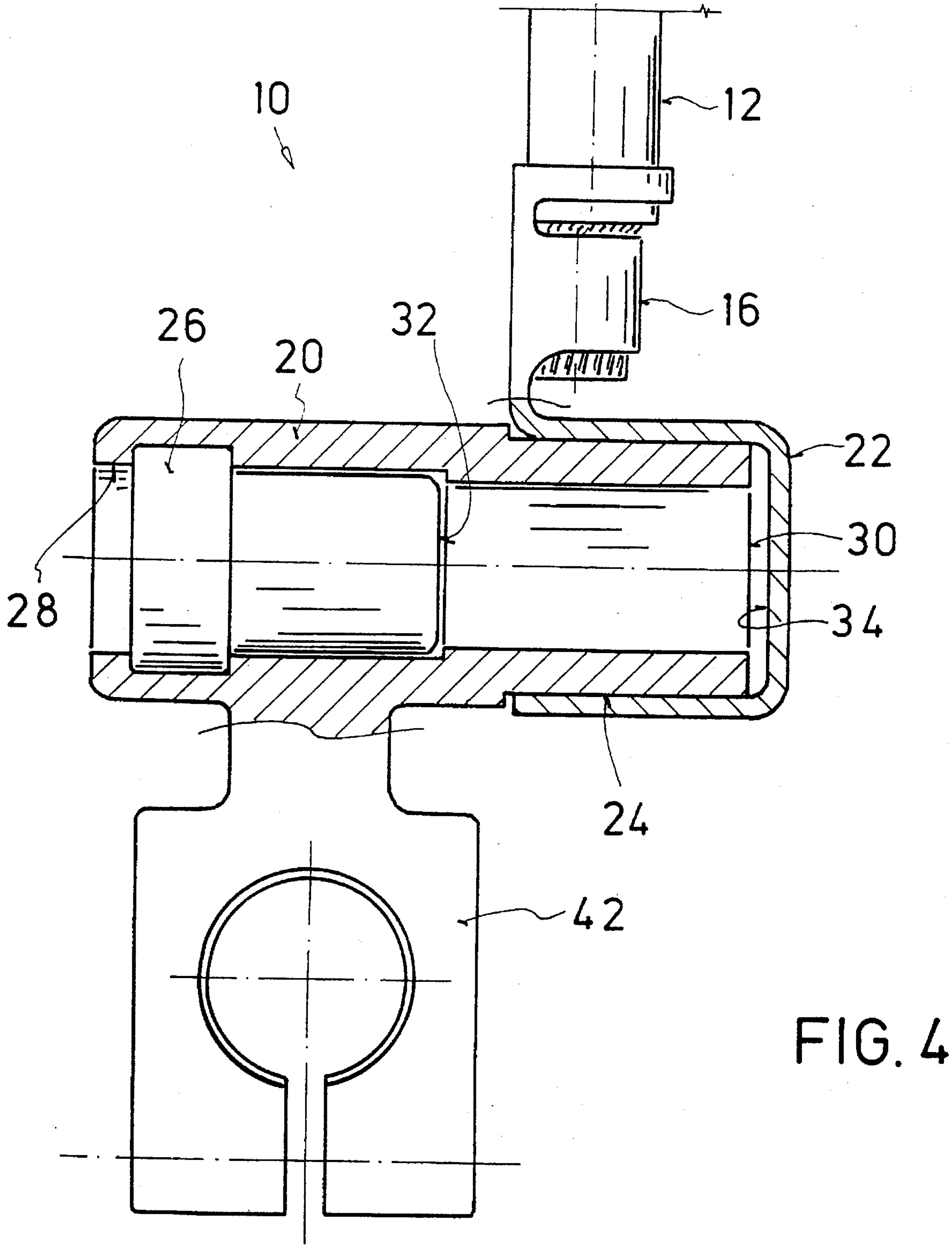
FIG. 4 is a longitudinal section through a fourth embodiment example of the invention.

In the embodiment examples of FIGS. 3 and 4, the contact surfaces 24 are provided immediately by the respective surfaces of the housing 20 and the plug connector 22. As required for the functioning of the plug-in connection 10, the housing 20 and the plug connector 22 are made of an electrically conductive material. Preferably, a brass is used here of the type used, for example, in cable shoes. If the circumstances demand, however, an aluminum or zinc die-casting could also be used. It should be understood here, however, that other materials could also be employed for this purpose.

As indicated in FIG. 1, the plug connector can be made as a casting. Alternatively, the plug connector 22 can be made as a deep-drawn sheet-metal part, as indicated in FIGS. 3 and 4.

Figure 2:
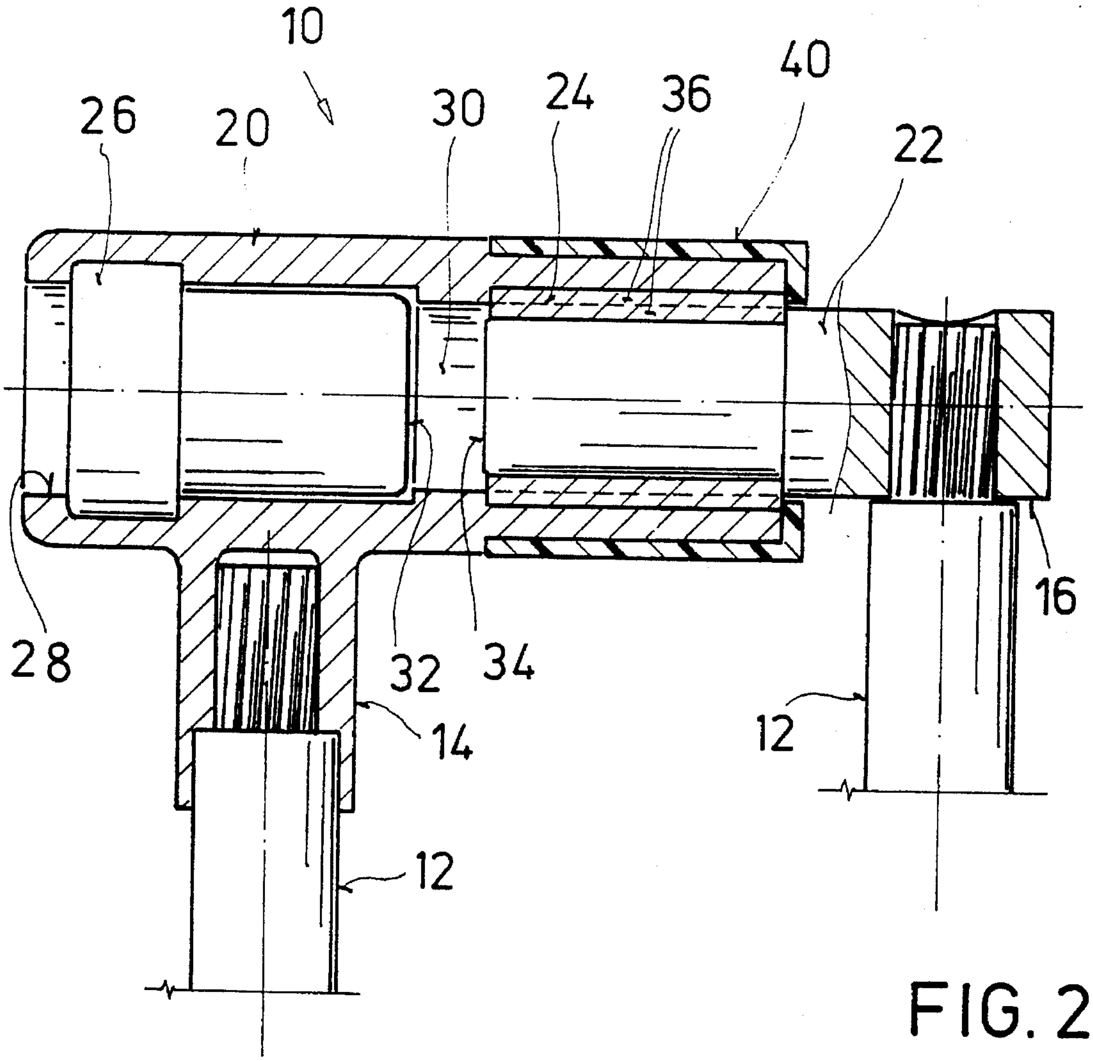
FIG. 2 is a longitudinal section through a second embodiment example of the invention.

As far as the electrical connections 20 are concerned, the connections normally used in the automotive industry can also be used here. One possibility is to solder the leads of the positive or impregnated battery cable 12 to tubular projections of the housing and the connector, as indicated in FIGS. 1,2 and 3 (connection on the left-hand side). Another possibility is to use so-called crimped connections as shown in FIG. 3 (connection on the right-hand side) and in FIG. 4.

As the Figures show, the electrical terminal connections 14,16 of the plug-in connection 10 are arranged perpendicularly to the longitudinal axis A in order not to obstruct the separating movement between housing and connector.

In the embodiment examples of FIGS. 1 to 3, the plug-in connection 10 is placed with its terminal connections 14,16 in the positive or impregnated battery cable 12. Another possibility would be to insert the plug-in connection between the positive or impregnated battery cable 12 and the associated terminal of the vehicle battery. This possibility is shown in FIG. 4 where the housing 20 and the associated battery terminal 42 are made in one piece. The plug connector 22 is then connected with the positive or impregnated battery cable 12 via the terminal connection 16.

It is advisable to surround the plug-in connection 10 completely or at least partially with an electrically insulating material. A rubber cap or a dipping varnish can be used for this purpose. A housing insulation 40 of this kind is indicated in FIG. 2. Owing to the design of the insulation, and by suitably fitting the plug-in connection 10 in the vehicle, there is no possibility of the plug connector 22 moving back rapidly to remake contact with the housing 20 following a disconnection.

What is claimed is:

1. Device for disconnecting the flow of current in the positive or impregnated battery cable of a motor vehicle, said device comprising an electrically conductive plug-in connection that allows current to flow through the positive or impregnated battery cable when connected and that interrupts current flow when disconnected, said plug-in connection including a tubular electrically conductive housing containing a gas generator which when electrically ignited produces a propellant gas and an electrically conductive plug connector, said housing extending axially into said plug connector and being connected together and contacting each other on contact surfaces that are parallel to a longitudinal axis of the plug-in connection and can be disconnected by a linear relative movement along the longitudinal axis, and wherein said housing has a free inner chamber that can be pressurized by the propellant gas which chamber is bounded at one front end by an exposed surface of the connector which is perpendicular to the longitudinal axis and is bounded at another front end on the opposite side by a surface of the gas generator which has a gas outlet aperture leading into the inner chamber, whereby when the gas generator is ignited the generated propellant gas causes the linear relative movement along the longitudinal axis between the housing and the plug-in connector to cause disconnection.

2. Device in accordance with claim 1 wherein the plug connector is made as a conical internal connector that can be inserted into the inside of the housing.

3. Device in accordance with claim 2, wherein the housing and the connector are each provided with an electrical terminal connection for inserting the plug-in connection into the positive or impregnated battery cable.

4. Device in accordance with claim 2 wherein the housing or the plug connector is connected directly to the battery terminal and the other part in each case with an electrical terminal connection for the purpose of connecting with the positive or impregnated battery cable.

5. Device in accordance with claim 3,wherein the electrical terminal connections protrude from the plug-in connection perpendicularly to the longitudinal axis.

6. Device in accordance with claim 5, wherein at least one of the housing and the plug connector made of brass.

7. Device in accordance with claim 4, wherein the electrical terminal connections protrude from the plug-in connection perpendicularly to the longitudinal axis.

8. Device in accordance with claim 7, wherein at least one of the housing and the plug connector made of brass.

9. Device in accordance with claim 8, wherein the contact surfaces between the housing and the plug connector are formed by inserts made of a non-corrosive material of low electrical resistance.

10. Device in accordance with claim 9, wherein the inserts are made of copper beryllium (CuBe).

11. Device in accordance with claim 10, wherein the plug-in connection is totally or partially surrounded by an insulating material.

12. Device in accordance with claim 1, wherein the plug connector is a sleeve-shaped external plug connector that can be pushed over the external surface of the housing.

13. Device in accordance with claim 12, wherein the housing and the plug connector are each provided with an electrical terminal connection for inserting the plug-in connection in the positive or impregnated battery cable.

14. Device in accordance with claim 13, wherein the electrical terminal connections protrude from the plug-in connection perpendicularly to the longitudinal axis.

15. Device in accordance with claim 14, wherein at least one of the housing and the plug connector is made of brass.

16. Device in accordance with claim 15, wherein the contact surfaces between the housing and the plug connector are created by inserts made of a non-corrosive material of low electrical resistance.

17. Device in accordance with claim 16, wherein the inserts are made of copper beryllium (CuBe).

18. Device in accordance with claim 17, wherein the plug-in connection is totally or partially surrounded by an insulating material.

19. Device in accordance with claim 12, wherein the housing or the plug connector is connected directly to the battery terminal and the other part in each case is connected with an electrical terminal connection for the purpose of connecting with the positive or impregnated battery cable.

20. Device in accordance with claim 19, wherein the electrical terminal connections protrude from the plug-in connection perpendicularly to the longitudinal axis.

21. Device in accordance with claim 19, wherein at least one of the housing and the plug connector are made of brass.

22. Device in accordance with claim 21, wherein the contact surfaces between the housing and the plug connector is formed by inserts made of a non-corrosive material of low electrical resistance.

23. Device in accordance with claim 22, wherein the inserts are made of copper beryllium (CuBe).

24. Device in accordance with claim 23, wherein the plug-in connection is totally or partially surrounded by an insulating material.

* * * * *